United States Patent
Viering et al.

(10) Patent No.: US 12,100,127 B2
(45) Date of Patent: Sep. 24, 2024

(54) COLOR EXTRAPOLATION FROM MONOCHROME IMAGE SENSOR

(71) Applicant: Boston Scientific Scimed, Inc., Maple Grove, MN (US)

(72) Inventors: Kirsten Viering, Newton, MA (US); Louis J. Barbato, Franklin, MA (US); George Wilfred Duval, Sudbury, MA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 462 days.

(21) Appl. No.: 17/480,281

(22) Filed: Sep. 21, 2021

(65) Prior Publication Data
US 2022/0101501 A1   Mar. 31, 2022

Related U.S. Application Data

(60) Provisional application No. 63/083,127, filed on Sep. 25, 2020.

(51) Int. Cl.
*G06T 5/92* (2024.01)
*G06T 5/73* (2024.01)
*G06T 7/90* (2017.01)

(52) U.S. Cl.
CPC .......... *G06T 5/92* (2024.01); *G06T 5/73* (2024.01); *G06T 7/90* (2017.01); *G06T 2207/10068* (2013.01); *G06T 2207/20221* (2013.01)

(58) Field of Classification Search
CPC .......... G06T 5/009; G06T 5/003; G06T 7/90; G06T 2207/10068; G06T 2207/20221;

(Continued)

(56) References Cited

U.S. PATENT DOCUMENTS

| 10,516,865 | B2 * | 12/2019 | Sidar | G06T 5/009 |
| 2005/0197536 | A1 * | 9/2005 | Banik | A61B 1/0016 600/179 |
| 2011/0063427 | A1 * | 3/2011 | Fengler | A61B 5/0071 348/E5.09 |
| 2014/0160260 | A1 | 6/2014 | Blanquart et al. | |

(Continued)

FOREIGN PATENT DOCUMENTS

| EP | 0772158 A2 | 5/1997 |
| JP | 2013144039 A | 7/2013 |

OTHER PUBLICATIONS

Anonymous: "YCbCr—Wikipedia", Sep. 20, 2020 (Sep. 20, 2020), XP055869676, Retrieved from the Internet: URL: https://en.wikipedia.org/w/index.php?title=YCbCr&oldid=979443015 [retrieved on Dec. 6, 2021] p. 3, lines 15-17.

(Continued)

*Primary Examiner* — Jose L Couso
(74) *Attorney, Agent, or Firm* — Bookoff McAndrews, PLLC (57) ABSTRACT

A medical device includes a sensor, a processor, and non-transitory computer readable medium storing imaging instructions. The sensor captures a first raw image into a first frame of raw pixel values including a plurality of first pixel values that represent pixels of a first color and a plurality of second pixel values that represent pixels of a second color. The sensor captures a second raw image into a second frame of raw pixel values including a plurality of third pixel values that represent pixels of the second color and a plurality of fourth pixel values that represent pixels of a third color. The processor convolves the first frame of raw pixel values with the second frame of raw pixel values to generate a first extrapolated frame of pixel values in a YCrCb format and creates a processed image from the first extrapolated frame of pixel values.

19 Claims, 7 Drawing Sheets

(58) Field of Classification Search
CPC ....... G06T 3/4015; G06T 5/40; G06T 3/4007; G06T 3/4053; G06T 2207/10016; G06T 2207/10024; G06T 2207/10028; G06T 2207/10048; G06T 2207/10064; G06T 2207/20092; G06T 2207/20104; G06T 7/0012; G06T 7/12; H04N 1/465; H04N 1/6016; H04N 9/646; H04N 9/67; H04N 9/77; H04N 19/59; H04N 23/10; H04N 23/74; H04N 23/58; H04N 23/741; H04N 23/84; H04N 23/843; H04N 23/88; H04N 25/11; H04N 25/611; H04N 25/67; H04N 25/68; H04N 1/58; H04N 1/60; H04N 25/134; A61B 1/000095; A61B 1/051; A61B 1/063; A61B 1/0638; A61B 1/0655; A61B 1/045; A61B 1/00186; A61B 2576/00; G06V 30/142; G09G 2320/0626; G09G 2320/0666

See application file for complete search history.

(56) References Cited

U.S. PATENT DOCUMENTS

| | | | |
|---|---|---|---|
| 2015/0042775 A1* | 2/2015 | Zhao | H04N 23/843 348/71 |
| 2018/0153386 A1* | 6/2018 | Omori | A61B 1/0005 |
| 2019/0139190 A1* | 5/2019 | Zhao | H04N 23/843 |
| 2019/0253685 A1 | 8/2019 | Blanquart et al. | |
| 2020/0163538 A1* | 5/2020 | Takahashi | A61B 1/043 |
| 2020/0211190 A1* | 7/2020 | Jørgensen | A61B 1/0684 |
| 2020/0397266 A1* | 12/2020 | Hufford | A61B 1/0684 |
| 2020/0402210 A1* | 12/2020 | Talbert | G06T 5/005 |

OTHER PUBLICATIONS

International Search Report issued in International Application No. PCT/US2021/051211 dated Jan. 5, 2022 (19 pages).

* cited by examiner

COLOR EXTRAPOLATION FROM MONOCHROME IMAGE SENSOR

CROSS-REFERENCE TO RELATED APPLICATIONS

This application claims the benefit of priority from U.S. Provisional Application No. 63/083,127, filed on Sep. 25, 2020, which is incorporated by reference herein in its entirety.

TECHNICAL FIELD

Various aspects of the disclosure relate generally to image processing systems, devices, and related methods. Examples of the disclosure relate to systems, devices, and related methods for digital chromoendoscopy, among other aspects.

BACKGROUND

Technological developments have given users of medical systems, devices, and methods, the ability to conduct increasingly complex procedures on subjects. One challenge in the field of minimally invasive surgeries is associated with visualizing target treatment sites within a subject, such as, for example, tumors or lesions located in a gastrointestinal tract of a subject. To facilitate the visualization of target treatment areas, digital image sensors are used to capture images of target treatment areas. However, depending on the type of image sensor used, an increase in image quality (e.g., contrast definition) generally comes with an increase in image processing overhead.

SUMMARY

Aspects of the disclosure relate to, among other things, systems, devices, and methods for providing an image processing system and imaging logic, among other aspects. Each of the aspects disclosed herein may include one or more of the features described in connection with any of the other disclosed aspects.

According to one aspect, a medical device includes a sensor, a processor, and non-transitory computer readable medium storing imaging instructions. The sensor is configured to capture a first raw image into a first frame of raw pixel values. The first frame of raw pixel values includes a plurality of first pixel values that represent pixels of a first color and a plurality of second pixel values that represent pixels of a second color. The sensor is further configured to capture a second raw image into a second frame of raw pixel values. The second frame of raw pixel values include a plurality of third pixel values that represent pixels of the second color and a plurality of fourth pixel values that represent pixels of a third color. The imaging instructions, when executed by the processor, causes the processor to convolve the first frame of raw pixel values with the second frame of raw pixel values to generate a first extrapolated frame of pixel values in a YCrCb format. The processor creates a processed image from the first extrapolated frame of pixel values.

Any of the medical devices described herein may include any of the following features. The first frame of raw pixel values does not include pixel values that represent pixels of the third color, and the second frame of raw pixel values does not include pixel values that represent pixels of the first color. The sensor includes a monochrome image sensor. The first color is red, the second color is green, and the third color is blue. A prior frame of raw pixel values is convolved with the first frame of raw pixel values to generate a second extrapolated frame of pixel values in a YCrCb format. A prior frame of raw pixel values is convolved with the second frame of raw pixel values to generate a second extrapolated frame of pixel values in a YCrCb format.

The sensor is further configured to capture a third raw image into a third frame of raw pixel values. The third frame of raw pixel values includes a plurality of fifth pixel values that represent pixels of the first color. The third frame of raw pixel values includes a plurality of sixth pixel values that represent pixels of the second color. The sensor is further configured to capture a fourth raw image into a fourth frame of raw pixel values. The fourth raw frame of raw pixels values includes a plurality of seventh pixel values that represent pixels of the second color. The fourth raw frame of raw pixels values includes a plurality of eighth pixel values that represent pixels of the third color. The third frame of raw pixel values is convolved with the fourth frame of raw pixel values to generate a second extrapolated frame of pixel values in a YCrCb format. The third frame of raw pixel values is convolved with the second frame of raw pixel values to generate a second extrapolated frame of pixel values in a YCrCb format. A prior frame of raw pixel values is convolved with the third frame of raw pixel values to generate a second extrapolated frame of pixel values in a YCrCb format. A prior frame of raw pixel values is convolved with the fourth frame of raw pixel values to generate a second extrapolated frame of pixel values in a YCrCb format. The third frame of raw pixel values does not include pixel values that represent pixels of the third color, and the fourth frame of raw pixel values does not include pixel values that represent pixels of the first color.

The imaging instructions stored in the non-transitory computer readable medium cause the processor to receive a motion compensation input to determine a phase correlation between the first frame and the second frame. The phase correlation is based on matching a relational pixel to pixel intensity in the first frame to a relational pixel to pixel intensity in the second frame. The imaging instructions stored in the non-transitory computer readable medium cause the processor to detect one or more edges within the first extrapolated frame of pixel values. The imaging instructions stored in the non-transitory computer readable medium cause the processor to perform a sharpened enhancement of the one or more edges. The imaging instructions stored in the non-transitory computer readable medium cause the processor to output a sharpened enhancement image created from performing the sharpened enhancement step. The imaging instructions stored in the non-transitory computer readable medium cause the processor to blend the sharpened enhancement image with the processed image. The imaging instructions stored in the non-transitory computer readable medium cause the processor to set a luminance value for pixels of the second color and for pixels of the third color. The imaging instructions stored in the non-transitory computer readable medium cause the processor to perform a contrast enhancement of the pixels of the second color and the pixels of the third color by modifying the luminance values to increase a contrast of the processed image. The imaging instructions stored in the non-transitory computer readable medium cause the processor to output a contrast enhancement image created from performing the contrast enhancement step. The imaging instructions stored in the non-transitory computer readable medium cause the processor to blend the contrast enhancement image with the processed image.

The medial device further includes a shaft and a light source coupled to the distal end of the shaft. The sensor is at a distal end of the shaft. The light source is an optical fiber, an ultraviolet light, or a multicolor LED array. The imaging instructions stored in the non-transitory computer readable medium cause the processor to output the processed image of the extrapolated frame of pixel values to a display device.

In another aspect, a medical device includes a sensor, a processor and, non-transitory computer readable medium storing imaging instructions. The sensor is configured to capture a first raw image into a first frame of raw pixel values, wherein the first frame of raw pixel values includes first pixel values that represent pixels of a first color. The sensor is configured to capture a second raw image into a second frame of raw pixel values, wherein the second frame of raw pixel values includes second pixel values that represent pixels of a second color. The sensor is configured to capture a third raw image into a third frame of raw pixel values, wherein the third frame of raw pixel values includes third pixel values that represent pixels of a third color. The imaging instructions, when executed by the processor, causes the processor to combine the first frame of raw pixel values and the second frame of raw pixel values with a first a prior frame of raw pixel values to generate a first extrapolated frame of pixel values in a YCrCb format. The imaging instructions, when executed by the processor, causes the processor. The imaging instructions, when executed by the processor, causes the processor create a processed image from the first extrapolated frame of pixel values.

Any of the medical devices described herein may include any of the following features. The imaging instructions stored in the non-transitory computer readable medium cause the processor to combine the second frame of raw pixel values and the third frame of raw pixel values with a second a prior frame of raw pixel values to generate a second extrapolated frame of pixel values in a YCrCb format. The imaging instructions stored in the non-transitory computer readable medium cause the processor to create a processed image from the second extrapolated frame of pixel values. The imaging instructions stored in the non-transitory computer readable medium cause the processor combine the first frame of raw pixel values and the third frame of raw pixel values with a third a prior frame of raw pixel values to generate a third extrapolated frame of pixel values in a YCrCb format. The imaging instructions stored in the non-transitory computer readable medium cause the processor to create a processed image from the third extrapolated frame of pixel values. The first a prior frame of raw pixel values includes third pixel values that represent pixels of the third color.

In another aspect, an image processing method includes capturing a first raw image into a first frame of raw pixel values. The first frame of raw pixel values include a plurality of first pixel values that represent pixels of a first color. The first frame of raw pixel values further include a plurality of second pixel values that represent pixels of a second color. The image processing method further includes capturing a second raw image into a second frame of raw pixel values. The second frame of raw pixel values include a plurality of third pixel values that represent pixels of the second color and a plurality of fourth pixel values that represent pixels of a third color. The image processing method further includes convolving the first frame of raw pixel values with the second frame of raw pixel values to generate a first extrapolated frame of pixel values in a YCrCb format. The imaging processing method further includes creating a processed image from the first extrapolated frame of pixel values.

It may be understood that both the foregoing general description and the following detailed description are exemplary and explanatory only and are not restrictive of this disclosure, as claimed.

BRIEF DESCRIPTION OF THE DRAWINGS

The accompanying drawings, which are incorporated in and constitute a part of this specification, illustrate exemplary aspects of the disclosure and together with the description, serve to explain the principles of the disclosure.

DETAILED DESCRIPTION

Examples of the disclosure include systems, devices, and methods for reducing the processing overhead of images captured by monochrome (or monochromatic) sensors (e.g., image sensors with no color filters). Reference will now be made in detail to aspects of the disclosure, examples of which are illustrated in the accompanying drawings. Wherever possible, the same or similar reference numbers will be used through the drawings to refer to the same or like parts. The term "distal" refers to a portion farthest away from a user when introducing a device into a patient. By contrast, the term "proximal" refers to a portion closest to the user when placing the device into the subject. As used herein, the terms "comprises," "comprising," or any other variation thereof, are intended to cover a non-exclusive inclusion, such that a process, method, article, or apparatus that comprises a list of elements does not necessarily include only those elements, but may include other elements not expressly listed or inherent to such process, method, article, or apparatus. The term "exemplary" is used in the sense of "example," rather than "ideal." As used herein, the terms "about," "substantially," and "approximately," indicate a range of values within +/−10% of a stated value.

Examples of the disclosure may be used to view target sites within a subject by generating processed images obtained by a monochrome sensor. The processing may extrapolate color from the monochrome dataset efficiently reducing the processing burden. In examples, the method may be used to visualize one or more features and/or characteristics of a luminal gastrointestinal tract of the subject. Such features and/or characteristics include, for example, tumors, lesions, blood vessels, changes in a mucosal surface, other selected tissue, and the like. In some embodiments, a medical device may include an image processing device including a processor and memory storing one or more algorithms for generating the color images. In embodiments, the memory may include programmable instructions in accordance with an imaging logic, a motion compensation logic, an edge enhancement logic, and/or a contrast enhancement logic. Further, the image processing device may include a user interface operable to receive a user input thereon, such as, for example, a re-coloring modality input for selecting a color extrapolation algorithm for applying to monochromatic datasets captured by an image sensor. The processed image produced by the image processing device of the medical device may be outputted to a display device.

Examples of the disclosure may relate to devices and methods for performing various medical procedures and/or visualizing portions of the large intestine (colon), small intestine, cecum, esophagus, any other portion of the gastrointestinal tract, and/or any other suitable patient anatomy (collectively referred to herein as a "target treatment site"). Various examples described herein include single-use or disposable medical devices. Reference will now be made in detail to examples of the disclosure described above and illustrated in the accompanying drawings. Wherever possible, the same reference numbers will be used throughout the drawings to refer to the same or like parts.

Figure 1:
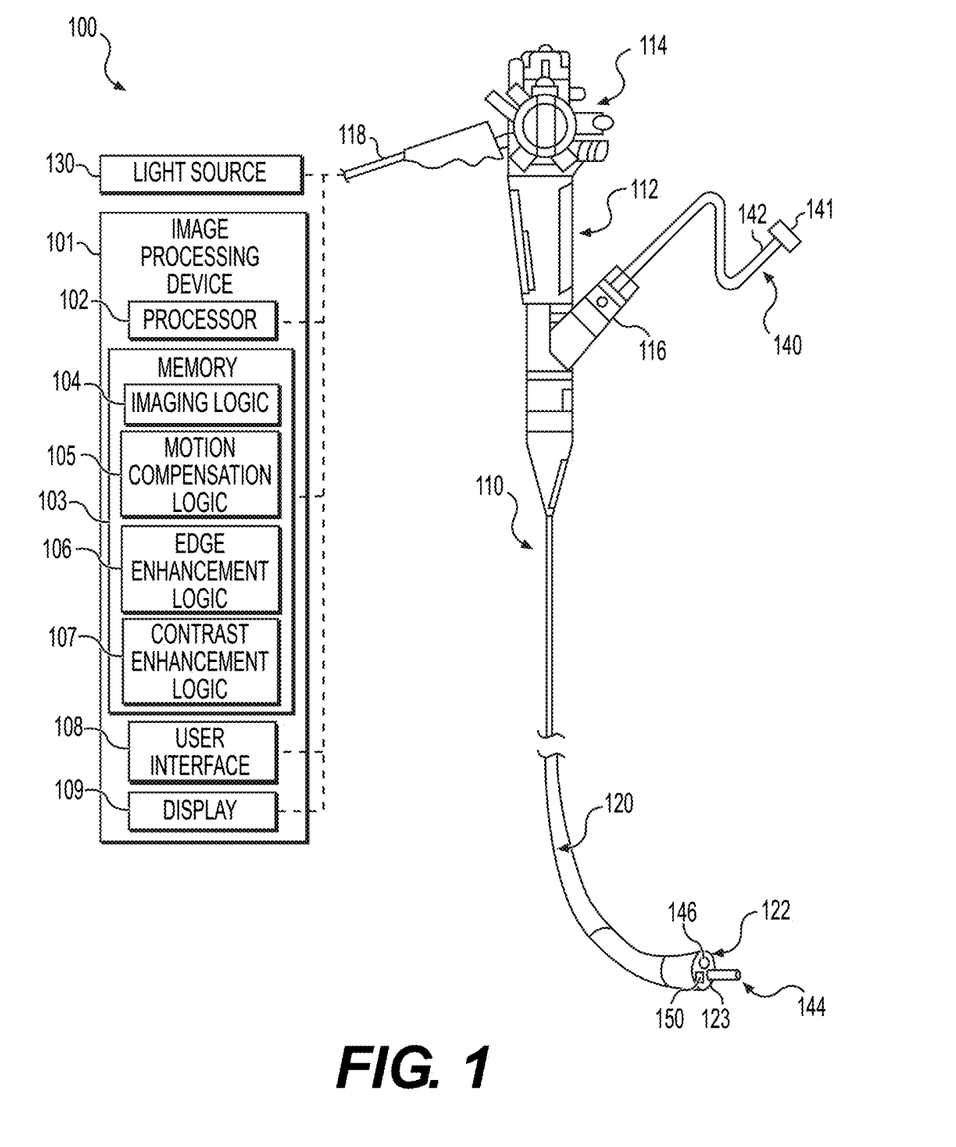
FIG. 1 is a schematic view of an exemplary medical system, according to aspects of this disclosure.

FIG. 1 shows a schematic depiction of an exemplary medical system 100 in accordance with an example of this disclosure. The medical system 100 may include one or more light sources 130, an image processing device 101, a medical instrument 110, and a medical device 140. The image processing device 101 may be communicatively coupled to the medical instrument 110 by, for example, a wired connection, a wireless connection, and the like. In examples, the image processing device 101 is a computer system incorporating a plurality of hardware components that allow the image processing device 101 to receive data (e.g., image sensor data), process information (e.g., wavelength data), and/or generate a processed image for outputting to a user of the medical system 100. Illustrative hardware components of the image processing device 101 may include at least one processor 102, at least one memory 103, at least one user interface 108, and at least one display 109.

The processor 102 of the image processing device 101 may include any computing device capable of executing machine-readable instructions, which may be stored on a non-transitory computer-readable medium, such as, for example, the memory 103 of the image processing device 101. By way of example, the processor 102 may include a controller, an integrated circuit, a microchip, a computer, and/or any other computer processing unit operable to perform calculations and logic operations required to execute a program. As described in greater detail herein, the processor 102 is configured to perform one or more operations in accordance with the instructions stored on the memory 103, such as, for example, an imaging logic 104, a motion compensation logic 105, an edge enhancement logic 106, a contrast enhancement logic 107, and the like.

Figure 2A:
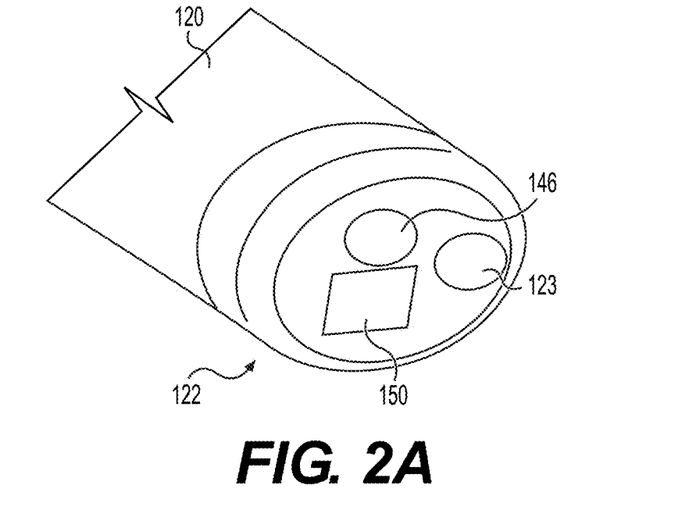
FIG. 2A is a partial perspective view of a distal end of a medical device of the medical system of FIG. 1 including a sensor and a light source, according to aspects of this disclosure.
Figure 2B:
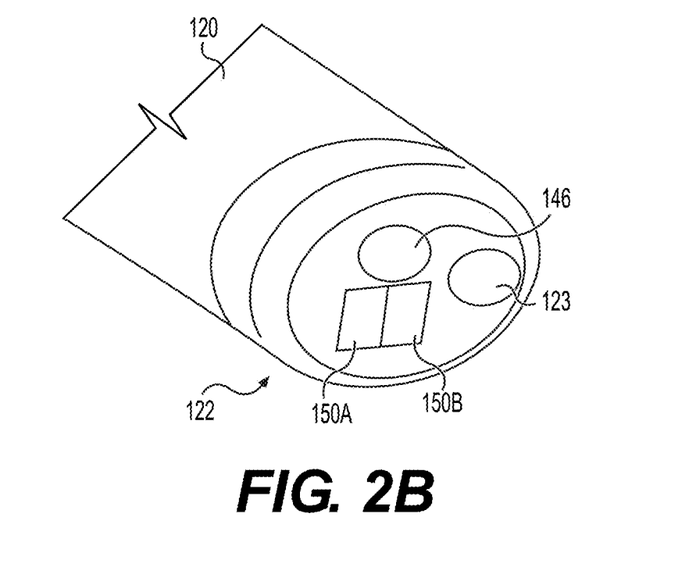
FIG. 2B is a partial perspective view of another distal end of a medical device of the medical system of FIG. 1 including a pair of sensors and a light source, according to aspects of this disclosure.

Still referring to FIG. 1, the memory 103 of the image processing device 101 may include a non-transitory computer readable medium that stores machine-readable instructions thereon, such as, for example, the imaging logic 104, the motion compensation logic 105, the edge enhancement logic 106, and the contrast enhancement logic 107. The imaging logic 104 may include executable instructions that allow the medical system 100 to capture raw digital images by activating one or more components of the medical instrument 110, such as, for example, one or more image sensors 150, 150A, 150B (FIGS. 1 and 2A-2B).

Further, the imaging logic 104 may include executable instructions that allow the medical system 100 to process digital images according to whether the image sensor includes a colored filter sensor array. For example, color sensors are image sensors with color filter arrays that sit below a micro lens array. The color filter array absorbs undesired color wavelengths so that each pixel of the color sensor is sensitive to a specific color wavelength. Digital images captured by color sensors are processed by demosaicing the image and reconstructing missing and/or unknown pixel values in the mosaiced image. Unlike color sensors, monochrome sensors do not have colored filter sensor arrays. As such, each pixel of the monochrome sensor is sensitive to all visible light wavelengths. It should be understood that digital images captured either by color sensors or monochrome sensors may provide a raw image having various color pixel values arranged in a mosaic pattern. Each pixel array of the pattern includes only a single color pixel value such that one or more color pixel values may be omitted thereon. As described in detail herein, digital images include a two-dimensional array of pixel values, with each pixel value corresponding to a light intensity in one of a plurality of spectral bands (e.g., color pixel values) at a pixel location in the image.

Still referring to FIG. 1, the motion compensation logic 105 may include executable instructions that allow the medical system 100 to motion compensate a mosaiced image. Because digital images are made up of frames captured at different wavelengths, the objects in each frame may need to undergo a motion compensation process (e.g., image registration) to geometrically align and recolor images for analysis. It should be understood that digital image processing may include inherent side effects, such as, for example, a variance in pixel intensity levels from frame to frame making feature registration a challenge even for still images.

Still referring to FIG. 1, the edge enhancement logic 106 may include executable instructions that allow the medical system 100 to process a mosaiced image of a target site and enhance a definition of one or more edges in the mosaiced image. It should be understood that digital image processing may include inherent side effects, such as, for example, degrading sharpness of one or more edges in the image. For example, a demosaicing process may attenuate a high-frequency detail of an image and/or accentuate a low-frequency detail of an image.

In this instance, chromatic fringing at the edges of sharp contrast boundaries within an image may occur, where the edges of sharp contrast boundaries may include fringe artifacts within the color pixels of the mosaiced image. As described further below, the edge enhancement logic 106 may include executable instructions that allow the medical system 100 to process a digital image (e.g., a mosaiced image) by detecting edges and increasing a detail of said edges to provide sharper definition of said images in the color pixels.

Still referring to FIG. 1, the contrast enhancement logic 107 may include executable instructions that allow the medical system 100 to process a mosaiced image of a target site and enhance a contrast of one or more pixels in the mosaiced image. It should be understood that digital image processing may include inherent side effects, such as, for example, diminishing a contrast of an image due to reduced color difference signals between pixels in the image.

In this instance, a resolution frame of the color pixels may lack sufficient brightness amongst the various color pixels for differentiating one or more features of the image. As described further below, the contrast enhancement logic 107 may include executable instructions that allow the medical system 100 to process a digital image (e.g., a mosaiced image) by scaling a luminance of certain color pixels and increasing a brightness of the resolution frame to provide clearer definition of said images in the color pixels.

In some embodiments, the imaging logic 104, the motion compensation logic 105, the edge enhancement logic 106, and/or the contrast enhancement logic 107 may include executable instructions that allow the medical system 100 to execute periodic image processing of a target site automatically without requiring user input. In other embodiments, the image processing device 101 may be configured to receive user inputs to initiate image processing of a target site, such as, for example, from a user interface 108 of the image processing device 101. It should be appreciated that, in some embodiments, the user interface 108 may be a device integral with the image processing device 101, and in other embodiments, the user interface 108 may be a remote device in communication (e.g., wireless, wired, etc.) with the image processing device 101.

It should be understood that various programming algorithms and data that support an operation of the medical system 100 may reside in whole or in part in the memory 103. The memory 103 may include any type of computer readable medium suitable for storing data and algorithms, such as, for example, random access memory (RAM), read only memory (ROM), a flash memory, a hard drive, and/or any device capable of storing machine-readable instructions. The memory 103 may include one or more data sets, including, but not limited to, image data from one or more components of the medical system 100 (e.g., the medical instrument 110, the medical device 140, etc.).

Still referring to FIG. 1, the medical instrument 110 may be configured to facilitate positioning one or more components of the medical system 100 relative to a subject (e.g., a patient), such as, for example, the medical device 140. In embodiments, the medical instrument 110 may be any type of endoscope, duodenoscope, gastroscope, colonoscope, ureteroscope, bronchoscope, catheter, or other delivery system, and may include a handle 112, an actuation mechanism 114, at least one port 116, and a shaft 120. The handle 112 of the medical instrument 110 may have one or more lumens (not shown) that communicate with a lumen(s) of one or more other components of the medical system 100. The handle 112 further includes the at least one port 116 that opens into the one or more lumens of the handle 112. The at least one port 116 is sized and shaped to receive one or more instruments therethrough, such as, for example, the medical device 140 of the medical system 100.

The shaft 120 of the medical instrument 110 may include a tube that is sufficiently flexible such that the shaft 120 is configured to selectively bend, rotate, and/or twist when being inserted into and/or through a subject's tortuous anatomy to a target treatment site. The shaft 120 may have one or more lumens (not shown) extending therethrough that include, for example, a working lumen for receiving instruments (e.g., the medical device 140). In other examples, the shaft 120 may include additional lumens such as a control wire lumen for receiving one or more control wires for actuating one or more distal parts/tools (e.g., an articulation joint, an elevator, etc.), a fluid lumen for delivering a fluid, an illumination lumen for receiving at least a portion of an illumination assembly (not shown), and/or an imaging lumen for receiving at least a portion of an imaging assembly (not shown).

Still referring to FIG. 1, the medical instrument 110 may further include a tip 122 at a distal end of the shaft 120. In some embodiments, the tip 122 may be attached to the distal end of the shaft 120, while in other embodiments the tip 122 may be integral with the shaft 120. For example, the tip 122 may include a cap configured to receive the distal end of the shaft 120 therein. The tip 122 may include one or more openings that are in communication with the one or more lumens of the shaft 120. For example, the tip 122 may include a working opening 123 through which the medical device 140 may exit from a working lumen of the shaft 120. It should be appreciated that other one or more openings at the tip 122 of the shaft 120 are not shown. The actuation mechanism 114 of the medical instrument 110 is positioned on the handle 112 and may include one or more knobs, buttons, levers, switches, and/or other suitable actuators. The actuation mechanism 114 is configured to control at least a deflection of the shaft 120 (e.g., through actuation of a control wire).

The medical device 140 of the medical system 100 may include a catheter having a longitudinal body 142 between a proximal end 141 of the medical device 140 and a distal end 144 of the medical device 140. The longitudinal body 142 of the medical device 140 may be flexible such that the medical device 140 is configured to bend, rotate, and/or twist when being inserted into a working lumen of the medical instrument 110. The medical device 140 may include a handle at the proximal end 141 of the longitudinal body 142 that may be configured to move, rotate, and/or bend the longitudinal body 142. Further, the handle at the proximal end 141 of the medical device 140 may define one or more ports (not shown) sized to receive one or more tools through the longitudinal body 142 of the medical device 140.

Still referring to FIG. 1, the medical instrument 110 may be configured to receive the medical device 140 via the at least one port 116, through the shaft 120 via a working lumen, and to the working opening 123 at the tip 122. In this instance, the medical device 140 may extend distally out of the working opening 123 and into a surrounding environment of the tip 122, such as, for example, at a target treatment site of a subject as described in further detail below. The distal end 144 of the medical device 140 may extend distally from the tip 122 in response to a translation of the longitudinal body 142 through the working lumen of the shaft 120. The medical device 140 may include one or more end effectors (not shown) at the distal end 144 of the longitudinal body 142, for performing one or more operations at a target treatment site.

The medical instrument 110 may be further configured to receive light from the one or more light sources 130. The light may be delivered through the shaft 120 via at least one of the lumens of the medical instrument 110, the lumens including an optical fiber 146. In the example, the one or more light sources 130 are shown as a separate component from the image processing device 101 such that the light sources 130 are coupled to the medical instrument 110 separately from the image processing device (e.g., via a cable 118). It should be appreciated that, in other embodiments, the one or more light sources 130 may be included on the image processing device 101 such that the light sources 130 may be communicatively coupled to the medical instrument 110 with the image processing device 101. Alternatively, light may be delivered via one or more LEDs at tip 122. The LEDs receive signals from light source 130 or other signal processor.

Referring now to FIGS. 2A-2B, the tip 122 of the medical instrument 110 is depicted in accordance with one or more examples of this disclosure. Referring initially to FIG. 2A, in one embodiment, the tip 122 of the medical instrument 110 may include an optical fiber 146 and an image sensor 150. In the example, the optical fiber 146 may be coupled to the one or more light sources 130 of the medical system 100, such that each of the one or more light sources 130 may transmit light through the single, optical fiber 146. Although not shown, it should be appreciated that multiple light sources 130 may be coupled to the optical fiber 146 via a fiber splitter/combiner. The optical fiber 146 of the medical instrument 110 may be configured and operable to deliver various amplitudes of light, from the one or more light sources 130, distally from the tip 122 of the shaft 120. In some embodiments, the optical fiber 146 may be configured to deliver white light, ultraviolet light, near-infrared (NIR) light, and/or various other wavelengths within or beyond a visible spectrum.

Still referring to FIG. 2A, the image sensor 150 of the medical instrument 110 may be communicatively coupled to the image processing device 101 of the medical system 100, such as, for example, via a wired connection, a wireless connection, and/or the like. The image sensor 150 of the medical instrument 110 may be configured and operable to capture a raw image (e.g., a digital image) of a surrounding environment of the tip 122 of the shaft 120. In some embodiments, the image sensor 150 may include an image sensor, such as, for example, an RGB (i.e., red-green-blue) digital sensor, an RGB-Ir (i.e., red-green-blue-infrared) digital sensor, a monochrome sensor, and/or the like. The image sensor 150 may include one or more components for filtering colors from white light, ultraviolet light, near-infrared light, and/or other wavelengths within or beyond a visible spectrum.

In other embodiments, referring now to FIG. 2B, the medical instrument 110 may include a multi sensor assembly at the tip 122 of the shaft 120. In this instance, the multi sensor assembly may include a color image sensor 150A and a monochrome image sensor 150B. The color image sensor 150A may be configured and operable to capture a portion of incoming light at each individual pixel location of the color image sensor 150A depending on a color of the incoming light. In some embodiments, the color image sensor 150A may include, for example, an RGB (red-green-blue digital sensor), an RGB-Ir (red-green-blue-infrared) digital sensor, and the like. As further described herein, the monochrome image sensor 150B may be configured and operable to fully capture all incoming light at each individual pixel location of the monochrome sensor 150B irrespective of a color of the incoming light.

Figure 3A:
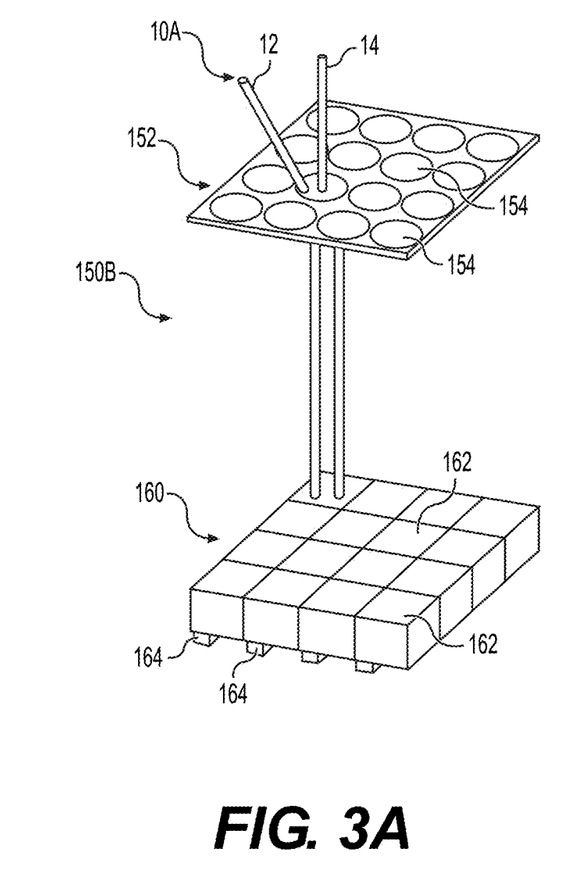
FIGS. 3A and 3B are schematic views of an exemplary image sensor of the medical device of FIG. 2A, according to aspects of this disclosure.
Figure 3B:
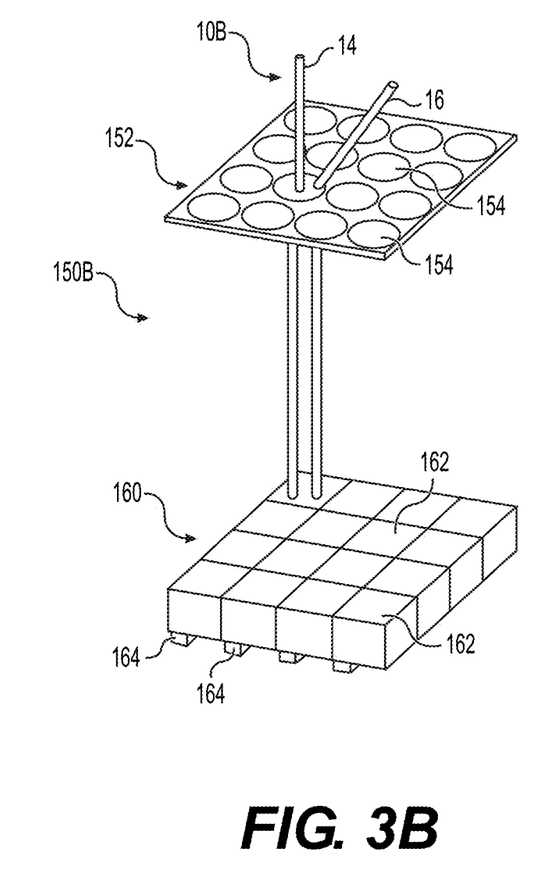

With reference now to FIGS. 3A and 3B, there is depicted a monochrome image sensor 150B according to one embodiment of the disclosure. As discussed above, monochrome sensors have a higher quantum efficiency (sensitivity) than color sensors and therefore provide opportunities for improved quality in the conversion of captured frames to true color (e.g., better contrast definition). The medical instrument 110 may include an exterior surface 152 having a plurality of micro lenses 154 disposed thereon. In some examples, the exterior surface 152 and/or the plurality of micro lenses 154 may be formed of glass, plastic, and/or other transparent materials.

Unlike color image sensors (e.g., color image sensor 150A), the monochrome image sensor 150B may be configured and operable to capture all wavelengths (e.g., light intensities, spectral bands, colors, etc.) of light beams 10A and 10B. The monochrome image sensor 150B may further include a photosensor array 160 disposed relatively underneath the exterior surface 152. The photosensor array 160 of the image sensor 150 may include a photodiode (e.g., semiconductor device) having a plurality of photosites 162 and a circuitry 164 communicatively coupled to the plurality of photosites 162.

Still referring to FIGS. 3A and 3B, the plurality of photosites 162 are arranged in an array (e.g., grid) with each of the plurality of photosites 162 positioned in alignment with at least one of the plurality of micro lenses 154 of the exterior surface 152. The photosensor array 160 may be configured and operable to convert light beams 10A and 10B received through the exterior surface 152 into an electrical current. In the example, the electrical current may be generated by the photosensor array 160 when photons from the received light are absorbed in the plurality of photosites 162.

In the example, each of the plurality of photosites 162 may be configured and operable to receive, capture, and absorb all wavelengths of incoming light. For example, in FIG. 3A, the monochrome image sensor 150B may be configured and operable to receive, capture, and absorb all of the wavelengths of light beam 10A, which includes wavelengths 12 and 14, at a location of the photosites 162 along a surface of the photosensor array 160. In FIG. 3B, the monochrome image sensor 150B may be configured to receive, capture, and absorb all wavelengths of light beam 10B, which includes wavelengths 14 and 16, at a location of the photosites 162 along a surface of the photosensor array 160. Accordingly, the plurality of photosites 162 may capture the incoming light and generate an electrical signal which is quantified and stored as a numerical value in a resulting processed image file. It should be appreciated that the photosensor array 160 may include various suitable shapes, sizes, and/or configurations other than that shown and described herein.

Exposing monochrome sensors to illuminations of red, blue, and green wavelengths for capturing images could result in three times the data sets using 90 frames per second (fps) to emulate a color imager at 30 frames per second (fps). As such, reproducing images in true color with monochrome sensors may create larger datasets requiring an increase in overhead for image processing.

In one aspect, this disclosure is directed to techniques and implementations for extrapolating color more efficiently from larger monochromatic data sets. In some embodiments, the monochrome image sensor 150B may be exposed to an illumination source of combined red and green wavelengths for a first frame capture, and then alternating the exposure to an illumination source of combined green and blue wavelengths for a subsequent frame capture. For example, FIG. 3A depicts a monochrome image sensor 150B exposed to light beam 10A, which combines wavelength 12 (e.g., red wavelength) and wavelength 14 (e.g., green wavelength). As such, the monochrome image sensor 150B may be configured and operable to receive, capture, and absorb the red and green wavelengths 12 and 14 at a location of the photosites 162 along a surface of the photosensor array 160. The resulting RG value (e.g., Red+Green value) is quantified and stored as a numerical value for a first frame in a resulting processed image file.

In FIG. 3B, a monochrome image sensor 150B may be exposed to a light beam 10B, which combines wavelength 14 (e.g., green wavelength) and wavelength 16 (e.g., blue wavelength). As such, the monochrome image sensor 150B may be configured and operable to receive, capture, and absorb the green and blue wavelengths 14 and 16 at a location of the photosites 162 along a surface of the photosensor array 160. The resulting GB value (e.g., Green+Blue value) is quantified and stored as a numerical value for a second frame in a resulting processed image file. In continued succession, the monochrome image sensor 150B may then be exposed again to the illumination source of combined red and green wavelengths for a subsequent frame capture, and then again to the illumination source of combined green and blue wavelengths in a frame capture after that. Notably, the green wavelength is common in each succession of the alternating sources of illumination.

The resulting RG and GB values (e.g., monochromatic data sets) may then be convolved for converting the values to the YCrCb color space, where Y is the luma component (e.g., luminence, light intensity, brightness) of color, Cr is the red chrominance of color, and Cb is the blue chrominance of color. The YCrCb color space may be extrapolated from the resulting RG and GB values according to the following formulas (1)-(3):

$$[R+G] - [B+G] = [R-B] \quad (1)$$

$$[R+G] + [B+G] = [2G+R+B] \quad (2)$$

$$[2G+R+B] \div 2 = Y \text{ (Luminence)} \quad (3)$$

This technique allows for the extrapolation of color from the two frames of RG and GB values to more efficiently process images to true color in only 60 fps.

Figure 8:
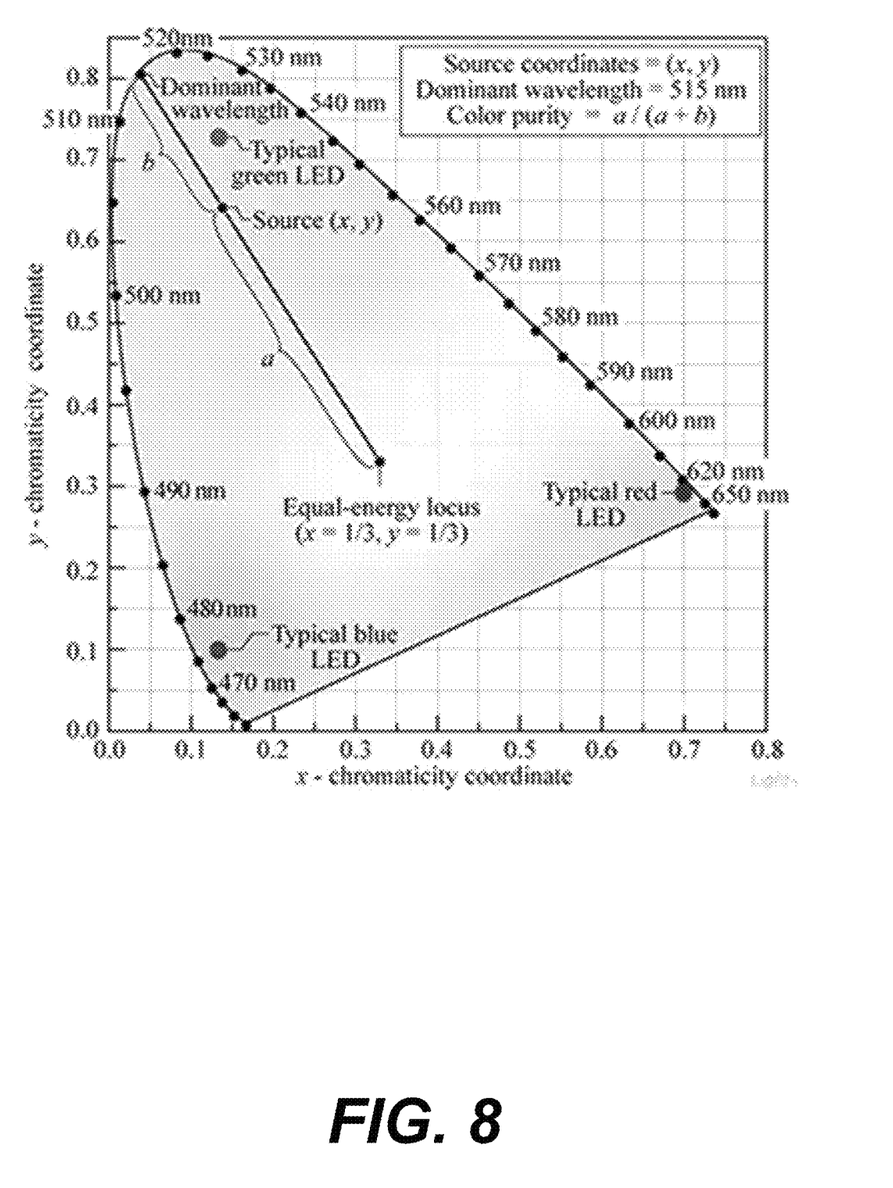
FIG. 8 is the International Commission on Illumination (CIE) chromaticity diagram retrieved from https://www-.digikey.com/en/articles/how-the-cie-color-space-is-used-to-design-better-leds.

In one aspect, the light source 130 may comprise red, green, and blue LEDs. The red, green, and blue LEDs may illuminate the photosensor array 160 sequentially and/or simultaneously by combining two or more different colors. For example, the red and blue LEDs may generate the light beam 10A, and the green and blue LEDs may generate the light beam 10B. In one embodiment, the International Commission on Illumination (CIE) color system, which characterizes colors by a luminance parameter (Y) and two color coordinates x and y which specify the point on the CIE chromaticity diagram (See FIG. 8), may be utilized to determine a third color based on at least two color coordinates of the red, green, and blue LEDs. For example, when the red and blue LEDs generate the light beam 10A to illuminate the photosensor array 160, the color coordinates of the red and blue LEDs may be determined based on the CIE chromaticity diagram (See FIG. 8) to interpolate a third color (e.g., green). Further, when green and blue LEDs generate the light beam 10B to illuminate the photosensor array 160, the color coordinates of the green and blue LEDs may be determined based on the CIE chromaticity diagram (See FIG. 8) to interpolate a third color (e.g., red).

In one embodiment, the CIE coordinates of the red, green, and blue LEDs may provide a coordinate system for interpolating a third color from any of the other two colors of the red, green, and blue LEDs. Further, the XYZ color space (i.e., an additive color space based on how the eye interprets stimulus from light) and the LAB color space (i.e., color space defined by the CIE) may also be utilized in combination with the CIE coordinates of the red, green, and blue LEDS to interpolate a third color from any of the other two colors of the red, green, and blue LEDs. The following formulas (1)-(12) based on the XYZ/LAB color space and the CIE coordinates of the red, green, and blue LEDs may be utilized to interpolate a missing color from any of the other two colors of the red, green, and blue LEDs:

$$\begin{bmatrix} X \\ Y \\ Z \end{bmatrix} = [M] \begin{bmatrix} R \\ G \\ B \end{bmatrix} \quad (1)$$

$$[M] = \begin{bmatrix} S_r X_r & S_g X_g & S_b X_b \\ S_r Y_r & S_g X_g & S_b X_b \\ S_r Z_r & S_g X_g & S_b X_b \end{bmatrix} \quad (2)$$

$$X_r = x_r / y_r \quad (3)$$

$$Y_r = 1 \quad (4)$$

$$Z_r = (1 - x_r - y_r) / y_r \quad (5)$$

$$X_g = x_g / y_g \quad (6)$$

$$Y_g = 1 \quad (7)$$

$$Z_g = (1 - x_g - y_g) / y_g \quad (8)$$

$$X_b = x_b / y_b \quad (9)$$

$$Y_b = 1 \quad (10)$$

$$Z_b = (1 - x_b - y_b) / y_b \quad (11)$$

$$\begin{bmatrix} S_r \\ S_g \\ S_b \end{bmatrix} = \begin{bmatrix} X_r & X_g & X_b \\ Y_r & Y_g & Y_b \\ Z_r & Z_g & Z_b \end{bmatrix}^{-1} \begin{bmatrix} X_W \\ Y_W \\ Z_W \end{bmatrix} \quad (12)$$

Figure 4:
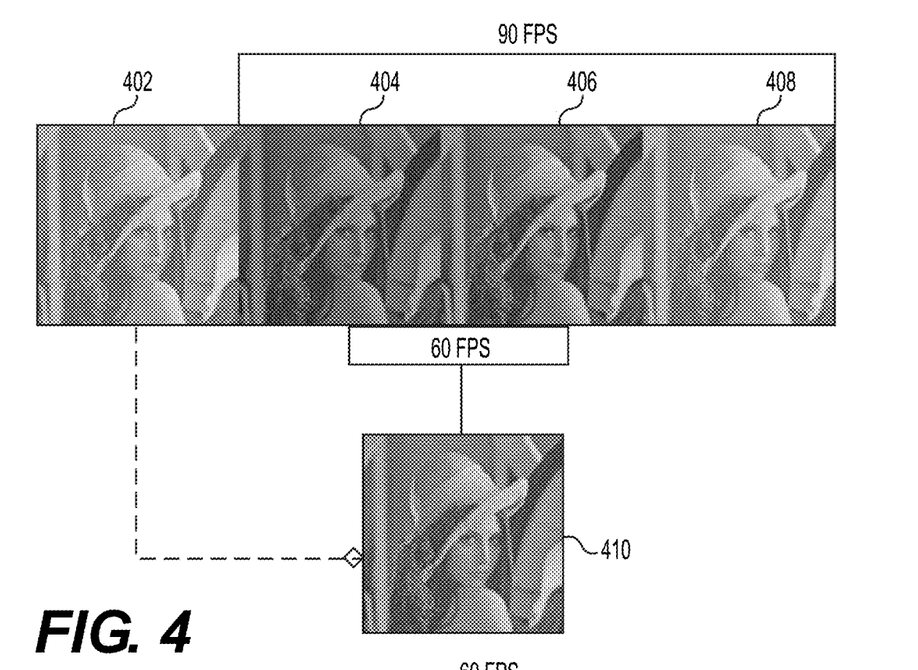
FIG. 4 is a schematic view of a series of frames of raw pixel data received from images captured by the image sensor of FIG. 3A and FIG. 3B, according to aspects of this disclosure.

In another aspect, the disclosure is directed to techniques and implementations for extrapolating color more efficiently by using prior data to interpolate the reconstruction of color. With reference now to FIG. 4, a red illumination frame 404, a green illumination frame 406, and a first blue illumination frame 408 generally represent the more heavily data burdened method to achieve a 30 fps color reproduction quality of an image at 90 fps. In some embodiments, the data sets captured from each of the red illumination frame 404 and the green illumination frame 406 at 60 fps can be combined with prior data, such as prior data from a second blue illumination frame 402, to interpolate a color reconstructed frame 410. Accordingly, the color reconstructed frame 410 is effectively achieved at 60 fps (down from 90 fps), with a reduction of the data set overhead by a third.

In another embodiment, the red illumination frame 404 and the green illumination frame 406 may be used as prior data for combining with the second blue illumination frame 402 in order to interpolate the color constructed frame 410. For example, initially, the first three (e.g., red, green, and blue) image frames (e.g., 404, 406, and 408) may be utilized to obtain a color image frame at 90 fps. The imaging logic 104 may then combine the prior data from the red illumination frame 404 and the green illumination frame 406 with the second blue illumination frame 402 to generate the color reconstructed frame 410. The second blue illumination frame 402, in this case, is the current image frame. That is, all subsequent color constructed frames generated after generating a color reconstructed frame based on the initial red, green, and blue image frames may not be delayed, because all subsequent frames may utilize the color information from the previously determined two image frames. As such, the color reconstructed frame 410 may be achieved at 30 fps. In another embodiment, the color reconstructed frame 410 may be generated at 60 fps by combining the data from a single prior frame to two subsequent image frames.

Figure 5:
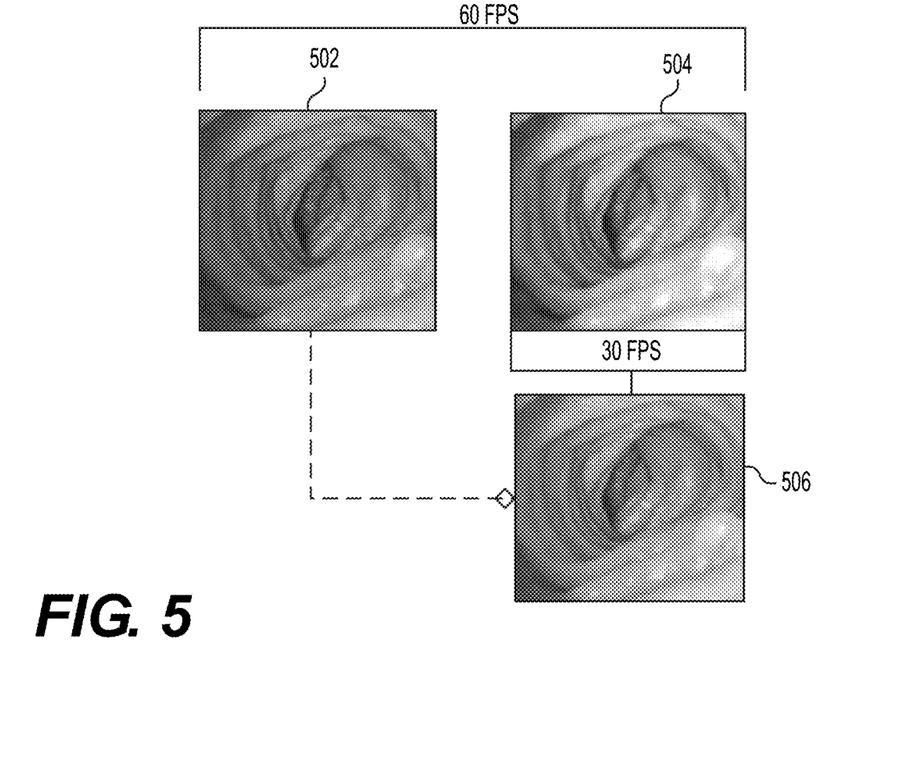
FIG. 5 is a schematic view of another series of frames of raw pixel data received from an image captured by the image sensors of FIG. 3A and FIG. 3B, according to aspects of this disclosure.

In yet another aspect, the disclosure is directed to techniques and implementations for extrapolating color more efficiently by using a prior data set, as discussed with reference to FIG. 4, combined with either of the resulting RG and GB values, as discussed above with reference to FIGS. 3A and 3B. With reference now to FIG. 5, a combined red and green (RG) data frame 502 and a combined green and blue (GB) data frame 504 generally represent the resulting RG and GB values captured by the monochrome image sensor 150B when exposed to the alternating sources of dual-wavelength illumination. Whereas the data sets for each of the RG data frame 502 and the GB data frame 504 were obtained using 60 fps, the color extrapolated frame 506 may be reconstructed using only 30 fps by convolving the resulting GB values of GB data frame 504 with the resulting RG values of a prior RG data frame 502. The color extrapolated frame 506 is obtained more efficiently with an even greater reduction in image processing overhead. It should be appreciated that the color extrapolated frame 506 may be similarly reconstructed using only 30 fps by convolving the resulting RG values of a RG data frame (not shown) with the resulting GB values of a prior GB data frame (not shown).

Figure 6A:
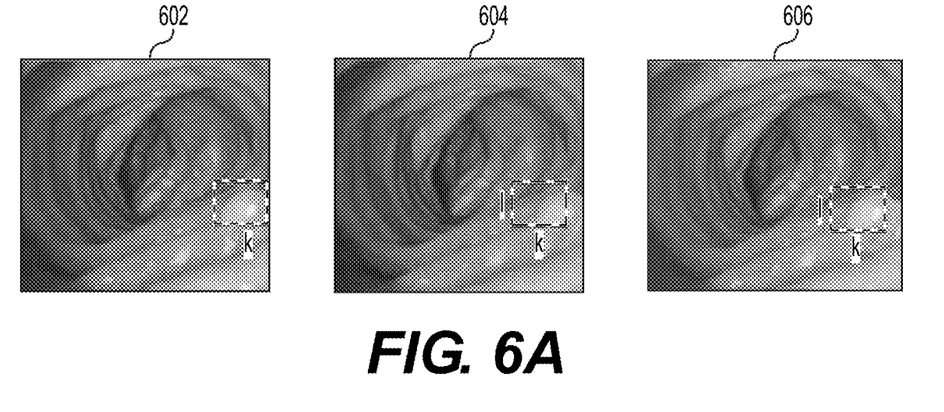
FIG. 6A is a schematic view of another series of frames of raw pixel data illustrating relational pixel to pixel intensity deltas, according to aspects of this disclosure.
Figure 6B:
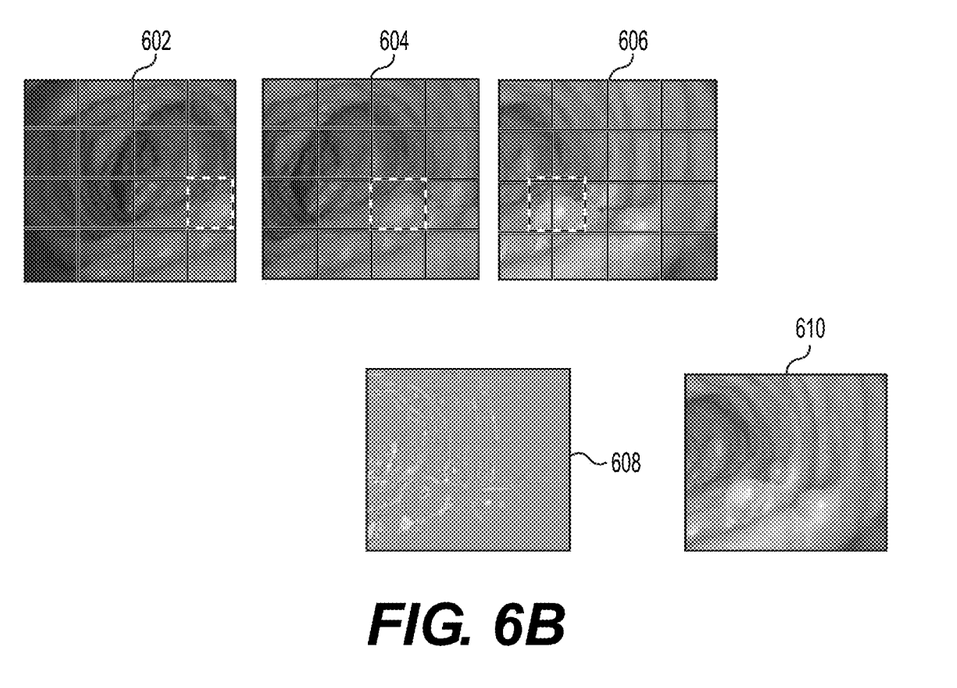
FIG. 6B is a schematic view of another series of frames of raw pixel data illustrating block matching for phase correlations, according to aspects of this disclosure.

With reference now to FIGS. 6A and 6B, there is depicted the use of spatio-temporal filtering for motion compensation, according to some embodiments. Each of the green wavelength frame 602, the blue wavelength frame 604, and the red wavelength frame 606 is captured in succession with a different wavelength. Therefore, the objects in each frame will need to be motion compensated in order to recolor the image. Block Matching may be used in motion compensation when the illumination source is not changing. Image registration, or image alignment, can remain a challenge since the intensity levels in the pixels will vary from frame to frame even for still images. In some embodiments, a modified technique looks for relational pixel to pixel intensity deltas in a similar sized k-l region in each of the green wavelength frame 602, the blue wavelength frame 604, and the red wavelength frame 606. Each of the blue, red, and green lights will have different pixel intensity matched blocks when pixel to pixel intensity levels are equivalent within the k-l block. Once the relative match is made, the block matching can be used for phase correlations, as shown in phase correlation 608, which results in translated image 610.

Figure 7:
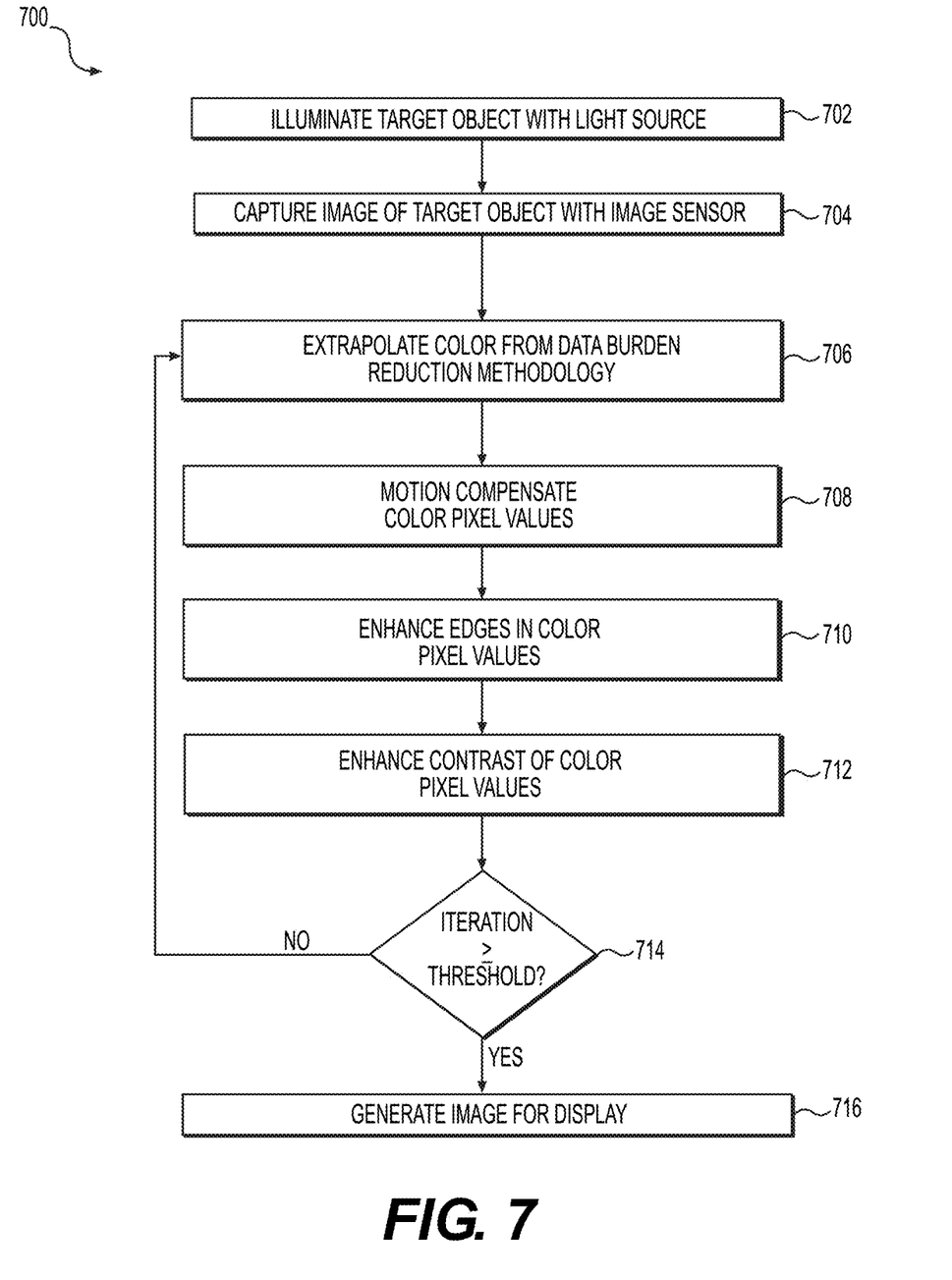
FIG. 7 is a block diagram of an exemplary method of imaging a target site with the medical system of FIG. 1, according to aspects of this disclosure.

Referring now to FIGS. 3A-6 in conjunction with the flow diagram of FIG. 7, an exemplary method 700 of using the medical system 100 to generate a processed image of a target site is schematically depicted. The depiction of FIGS. 3A-6 and the accompanying description below is not meant to limit the subject matter described herein to a particular method.

Initially, referring to FIG. 1, the medical instrument 110 of the medical system 100 may be inserted within a subject's body (not shown) to position the tip 122 adjacent to a target site. For example, the shaft 120 may be guided through a digestive tract of the subject (e.g., patient) by inserting the tip 122 into a nose or mouth (or other suitable natural body orifice) of the subject's body and traversed through a gastrointestinal tract of the subject's body (e.g., an esophagus, a stomach, a small intestine, etc.) until reaching the target site. It should be appreciated that a length of the shaft 120 may be sufficient so that a proximal end of the medical instrument 110 (including the handle 112) is external of the subject while the tip 122 of the medical instrument 110 is internal to the subject's body. While this disclosure relates to the use of the medical system 100 in a digestive tract of a subject, it should be understood that the features of this disclosure could be used in various other locations (e.g., other organs, tissue, etc.) within a subject's body.

Additionally, with the medical instrument 110 received within the subject and the tip 122 of the shaft 120 located relatively adjacent to the target site, the medical device 140 may be received within the medical instrument 110 via the at least one port 116. In this instance, the longitudinal body 142 of the medical device 140 is translated through the shaft 120 via at least one of the lumens of the shaft 120 (e.g., a working lumen). The distal end 144 of the longitudinal body 142 may be extended distally from the tip 122 of the shaft 120 via the working opening 123 which is in communication with a working lumen of the shaft 120. It should be appreciated that this step may be optional such that receiving the medical device 140 through the medical instrument 110 may be performed at various other steps in the method 700 and/or omitted entirely. The tip 122 may be positioned adjacent to and facing the target treatment site.

Referring to FIG. 7, at step 702, the one or more target objects may be illuminated by the medical instrument 110 in response to the processor 102 of the image processing device 101 executing the imaging logic 104 to activate the one or more light sources 130. In an example with the medical instrument 110 including the optical fiber 146 (FIG. 2A), light from the one or more light sources 130 may be emitted from the medical instrument 110 at the tip 122 to illuminate the target object.

At step 704, with the target object illuminated by light from the medical instrument 110, the image sensor 150 may be activated by the processor 102 executing the imaging logic 104 to capture one or more raw digital images of the target object. It should be understood that the processor 102 of the image processing device 101 may be communicatively coupled to the image sensor 150 of the medical instrument 110 via the circuitry 164. For example, referring back to FIGS. 3A-B, the light transmitted to the target object by the optical fiber 146 may reflect off the target object and be received at the image sensor 150 as light beams 10A and 10B. In this instance, the plurality of wavelengths 12, 14, 16 of the light beams 10A and 10B may be received through one or more of the plurality of micro lenses 154 on the exterior surface 152.

Still referring to FIGS. 3A-B, the individual wavelengths 12, 14, 16 of the light beams 10A/10B may be detected along the photosensor array 160 and absorbed by one or more of the plurality of photosites 162. In this instance, the portion of the light beams 10A and 10B absorbed by each of the plurality of photosites 162 may be converted into an electrical current. The raw digital image captured by the image sensor 150 may include a quantitative recording of light energy measured at each grid location of the photosites 162 along the photosensor array 160, with each photosite 162 configured to determine a color pixel value of the wavelength 12, 14, 16 received thereon.

In this instance, the processor 102 of the image processing device 101, when executing the imaging logic 104, may cause the photosensor array 160 to transmit an electrical signal of the color pixel values to the image processing device 101, such as, for example, via the circuitry 164. The electrical signal of the color pixel values may be stored in the memory 103 of the image processing device 101 and utilized by the demosaicing logic 105, the edge enhancement logic 106, the contrast enhancement logic 107, and/or the motion compensation logic 105 to generate a processed image.

Referring to FIG. 7, at step 706, a data burden reduction methodology is applied to monochromatic data sets for extrapolating color more efficiently by reducing the overhead in image processing. It should be appreciated that, in some embodiments, the data burden reduction methodology of step 706 may include the convolution of RG data and GB data (as captured by monochrome image sensor 150B) during an alternating illumination sequence between a combined red wavelength and green wavelength alternating with a combined green wavelength with a blue wavelength, as described in connection with FIGS. 3A and 3B. In other embodiments, the data burden reduction methodology may include the use of a prior data to interpolate the reconstruction of color images, as described in connection with FIG. 4. In yet another embodiment, the data burden reduction methodology may include the use of the convolution of RG data and GB data in combination with using a prior RG data or a prior GB data, as described in connection with FIG. 5. Each of these methodologies allows for the reconstruction of color images with a reduction in image processing overhead.

Still referring to FIG. 7, at step 708, the processor 102 may perform a motion compensation process (e.g., feature registration or alignment) using a spatio-temporal filtering, as described in connection with FIGS. 6A and 6B. It is to be appreciated that feature registration may be a challenge since intensity levels in the pixels will vary from to frame even for still images. Observing relational pixel to pixel intensity deltas serves to better align features and recolor images that have been captured with different wavelengths.

Still referring to FIG. 7, at step 710, the processor 102 of the image processing device 101 may execute the edge enhancement logic 106 to further reconstruct the raw digital image captured by the image sensor 150. In the example, the edge enhancement logic 106, when executed by the processor 102, may enhance a detail and/or definition of one or more edges in a frame of raw pixel values. For example, the processor 102 may detect a location of one or more edges within each grid location in the frame of raw pixel values and minimize a noise level surrounding the edge(s) by adjusting one or more of the plurality of second color pixel values at the grid location. In some embodiments, the processor 102 may increase a sharpness of one or more edges in a grid location by enhancing a gradient (e.g., magnitude) of the plurality of second color pixel values.

Still referring to FIG. 7, at step 712, the processor 102 of the image processing device 101 may execute the contrast enhancement logic 107 to further reconstruct the raw digital image captured by the image sensor 150. In the example, the contrast enhancement logic 107, when executed by the processor 102, may enhance a contrast of the representation in the frame of raw pixel values. For example, the processor 102 may increase a brightness component (e.g., a luminance) of one or more of the plurality of second color pixel values within each grid location in the frame of raw pixel values. In some embodiments, the processor 102 may modify a brightness of one or more grid locations within the frame of raw pixel values by scaling down the second color pixel values located therein to reduce the contrast contribution provided by the second color pixel values.

Still referring to FIG. 7, at step 714, the processor 102 of the image processing device 101 may determine whether a current iteration of the motion compensation process 708, the edge enhancement process 710, and the contrast enhancement process 712 is equal to or greater than a predetermined iterative threshold. In some embodiments, the predetermined iterative threshold may be predefined and stored in the memory 103 of the image processing device 101. In other embodiments, the predetermined iterative threshold may be selectively inputted by a user of the medical system 100.

In response to the processor 102 determining that the current iteration of the method 700 is less than the predetermined threshold at step 714, the image processing device 101 may be configured and operable to return to steps 706, 708, 710, and 712 to execute one or more of the motion compensation, edge enhancement, and/or contrast enhancement processes. In response to the processor 102 determining that the current iteration of the method 700 is at least equal to or greater than the predetermined threshold at step 712, the image processing device 101 may be configured and operable to produce an interpolated output image. It should be appreciated that an image with improved definition, contrast, and/or visibility may be provided in response to an iterative enhancement of the frame of raw pixel values initially captured by the image sensor 150.

Still referring to FIG. 7, at step 716, the processor 102 of the image processing device 101 may generate a processed image resulting from the processes of the method 700 shown and described herein. In the example, the output image may include a frame of color pixel values. With the display 109 of the medical system 100 communicatively coupled to the processor 102 of the image processing device 101, the processor 102 may be operable to transmit the image to the display 109 for viewing by a user of the medical system 100. In some examples, the medical system 100 may be configured and operable to continuously execute the method 700 shown and described herein such that the display 109 may output a plurality of partial-resolution images to provide a continuous (e.g., live, real-time, etc.) imaging of the one or more target objects.

It should be understood that methods according to this disclosure may not include all of the method steps identified in FIG. 7. For example, methods according to this disclosure may exclude one or more of steps 708, 710, 712, and 714.

In embodiments where the tip 122 of the shaft 120 includes the color image sensor 150A (e.g., RGB-Ir sensor) and the monochrome image sensor 150B, the image processing device 101 may be configured to generate an image captured by the color image sensor 150A while further enhancing a contrast of relatively darker areas within the frame of raw pixel values with the monochrome image sensor 150B. In this instance, the monochrome image sensor 150B may be sensitive to a near-infrared wavelength illuminated in the light beams 10A and 10B such that the fourth color pixel values (e.g., infrared) may be easily detected. It should be appreciated that providing one or more materials in the target treatment site may facilitate a visualization of the one or more target objects by the monochrome image sensor 150B, such as, for example, a fluorescent dye.

Each of the aforementioned systems, devices, assemblies, and methods may be used to generate a frame of pixel values of a subject. By providing a medical device including an image processing system storing an imaging logic, a user may enhance a visualization of one or more features and/or characteristics of a target site within a subject during a procedure without requiring manipulation of a light source. The medical device may allow a user to accurately visualize a location of a target site, thereby reducing overall procedure time, increasing efficiency of procedures, and avoiding unnecessary harm to a subject's body caused by inaccurately locating target objects in the target treatment site.

It will be apparent to those skilled in the art that various modifications and variations may be made in the disclosed devices and methods without departing from the scope of the disclosure. It should be appreciated that the disclosed devices may include various suitable computer systems and/or computing units incorporating a plurality of hardware components, such as, for example, a processor and non-transitory computer-readable medium, that allow the devices to perform one or more operations during a procedure in accordance with those described herein. Other aspects of the disclosure will be apparent to those skilled in the art from consideration of the specification and practice of the features disclosed herein. It is intended that the specification and examples be considered as exemplary only.

It should be appreciated that the image processing device 101 in FIG. 1 may be any computing device. The image processing device 101 also may include input and output ports to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

In one embodiment, any of the disclosed systems, methods, and/or graphical user interfaces may be executed by or implemented by a computing system consistent with or similar to the descriptions herein. Although not required, aspects of this disclosure are described in the context of computer-executable instructions, such as routines executed by a data processing device, e.g., a server computer, wireless device, and/or personal computer. Those skilled in the relevant art will appreciate that aspects of this disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "computing device," and the like, are generally used interchangeably herein, and refer to any of the above devices and systems, as well as any data processor.

Aspects of this disclosure may be embodied in a special purpose computer and/or data processor that is specifically programmed, configured, and/or constructed to perform one or more of the computer-executable instructions explained in detail herein. While aspects of this disclosure, such as certain functions, are described as being performed exclusively on a single device, this disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of this disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of this disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the disclosure disclosed herein. It is intended that the specification and examples be considered as exemplary only, with a true scope and spirit of this disclosure being indicated by the following claims.

It should be understood that one or more of the aspects of any of the medical devices described herein may be using in combination with any other medical device known in the art, such as medical imaging systems or other scopes such as colonoscopes, bronchoscopes, ureteroscopes, duodenoscopes, etc., or other types of imagers.

While principles of this disclosure are described herein with reference to illustrative examples for particular applications, it should be understood that the disclosure is not limited thereto. Those having ordinary skill in the art and access to the teachings provided herein will recognize additional modifications, applications, and substitution of equivalents all fall within the scope of the examples described herein. Accordingly, this disclosure is not to be considered as limited by the foregoing description.

We claim:

1. A medical device, comprising:
a sensor configured to: i) capture a first raw image into a first frame of raw pixel values that includes (a) a plurality of first pixel values that represent pixels of a first color and (b) a plurality of second pixel values that represent pixels of a second color, and ii) capture a second raw image into a second frame of raw pixel values that includes (a) a plurality of third pixel values that represent pixels of the second color and (b) a plurality of fourth pixel values that represent pixels of a third color; and
a processor and non-transitory computer readable medium storing imaging instructions that, when executed by the processor, causes the processor to:
receive a motion compensation input to determine a phase correlation between the first frame and the second frame, wherein the phase correlation is based on matching a relational pixel to pixel intensity in the first frame to a relational pixel to pixel intensity in the second frame;
convolve the first frame of raw pixel values with the second frame of raw pixel values to generate a first extrapolated frame of pixel values in a YCrCb format; and
create a processed image from the first extrapolated frame of pixel values.

2. The medical device of claim 1, wherein the first frame of raw pixel values does not include pixel values that represent pixels of the third color, and the second frame of raw pixel values does not include pixel values that represent pixels of the first color.

3. The medical device of claim 1, wherein the sensor includes a monochrome image sensor; and
wherein the first color is red, the second color is green, and the third color is blue.

4. The medical device of claim 1, wherein a prior frame of raw pixel values is convolved with the first frame of raw pixel values to generate a second extrapolated frame of pixel values in a YCrCb format.

5. The medical device of claim 1, wherein a prior frame of raw pixel values is convolved with the second frame of raw pixel values to generate a second extrapolated frame of pixel values in a YCrCb format.

6. The medical device of claim 1, wherein the sensor is further configured to: i) capture a third raw image into a third frame of raw pixel values that includes (a) a plurality of fifth pixel values that represent pixels of the first color and (b) a plurality of sixth pixel values that represent pixels of the second color, and ii) capture a fourth raw image into a fourth frame of raw pixel values that includes (a) a plurality of seventh pixel values that represent pixels of the second color and (b) a plurality of eighth pixel values that represent pixels of the third color.

7. The medical device of claim 6, wherein the third frame of raw pixel values is convolved with the fourth frame of raw pixel values to generate a second extrapolated frame of pixel values in a YCrCb format.

8. The medical device of claim 6, wherein the third frame of raw pixel values is convolved with the second frame of raw pixel values to generate a second extrapolated frame of pixel values in a YCrCb format.

9. The medical device of claim 6, wherein a prior frame of raw pixel values is convolved with the third frame of raw pixel values to generate a second extrapolated frame of pixel values in a YCrCb format.

10. The medical device of claim 6, wherein a prior frame of raw pixel values is convolved with the fourth frame of raw pixel values to generate a second extrapolated frame of pixel values in a YCrCb format.

11. The medical device of claim 6, wherein the third frame of raw pixel values does not include pixel values that represent pixels of the third color, and the fourth frame of raw pixel values does not include pixel values that represent pixels of the first color.

12. The medical device of claim 1, wherein the imaging instructions stored in the non-transitory computer readable medium cause the processor to:
detect one or more edges within the first extrapolated frame of pixel values;
perform a sharpened enhancement of the one or more edges;
output a sharpened enhancement image created from performing the sharpened enhancement step; and
blend the sharpened enhancement image with the processed image.

13. The medical device of claim 12, wherein the imaging instructions stored in the non-transitory computer readable medium cause the processor to:
set a luminance value for pixels of the second color and for pixels of the third color;
perform a contrast enhancement of the pixels of the second color and the pixels of the third color by modifying the luminance values to increase a contrast of the processed image;
output a contrast enhancement image created from performing the contrast enhancement step; and
blend the contrast enhancement image with the processed image.

14. The medical device of claim 1, further comprising:
a shaft, wherein the sensor is at a distal end of the shaft; and
a light source coupled to the distal end of the shaft, wherein the light source is an optical fiber, an ultraviolet light, or a multicolor LED array, and
wherein the imaging instructions stored in the non-transitory computer readable medium cause the processor to:
output the processed image of the extrapolated frame of pixel values to a display device.

15. A medical device, comprising:
a sensor configured to:
capture a first raw image into a first frame of raw pixel values, wherein the first frame of raw pixel values includes first pixel values that represent pixels of a first color;
capture a second raw image into a second frame of raw pixel values, wherein the second frame of raw pixel values includes second pixel values that represent pixels of a second color; and
capture a third raw image into a third frame of raw pixel values, wherein the third frame of raw pixel values includes third pixel values that represent pixels of a third color; and
a processor and non-transitory computer readable medium storing imaging instructions that, when executed by the processor, causes the processor to:
receive a motion compensation input to determine a phase correlation between the first frame and the second frame, wherein the phase correlation is based on matching a relational pixel to pixel intensity in the first frame to a relational pixel to pixel intensity in the second frame;

combine the first frame of raw pixel values and the second frame of raw pixel values with a first prior frame of raw pixel values to generate a first extrapolated frame of pixel values in a YCrCb format; and create a processed image from the first extrapolated frame of pixel values.

16. The medical device of claim 15, wherein the imaging instructions stored in the non-transitory computer readable medium cause the processor to:

combine the second frame of raw pixel values and the third frame of raw pixel values with a second prior frame of raw pixel values to generate a second extrapolated frame of pixel values in a YCrCb format; and create a processed image from the second extrapolated frame of pixel values.

17. The medical device of claim 15, wherein the imaging instructions stored in the non-transitory computer readable medium cause the processor to:

combine the first frame of raw pixel values and the third frame of raw pixel values with a third prior frame of raw pixel values to generate a third extrapolated frame of pixel values in a YCrCb format; and create a processed image from the third extrapolated frame of pixel values.

18. The medical device of claim 15, wherein the first prior frame of raw pixel values includes third pixel values that represent pixels of the third color.

19. An image processing method, comprising:

capture a first raw image into a first frame of raw pixel values that includes (a) a plurality of first pixel values that represent pixels of a first color and (b) a plurality of second pixel values that represent pixels of a second color;

capture a second raw image into a second frame of raw pixel values that includes (a) a plurality of third pixel values that represent pixels of the second color and (b) a plurality of fourth pixel values that represent pixels of a third color;

receive a motion compensation input to determine a phase correlation between the first frame and the second frame, wherein the phase correlation is based on matching a relational pixel to pixel intensity in the first frame to a relational pixel to pixel intensity in the second frame;

convolve the first frame of raw pixel values with the second frame of raw pixel values to generate a first extrapolated frame of pixel values in a YCrCb format; and create a processed image from the first extrapolated frame of pixel values.

* * * * *